United States Patent
Fernandez Martinez et al.

(10) Patent No.: US 12,464,607 B2
(45) Date of Patent: Nov. 4, 2025

(54) COOKING DEVICE

(71) Applicant: BSH Hausgeräte GmbH, Munich (DE)

(72) Inventors: Manuel Fernandez Martinez, Saragossa (ES); Ignacio Garde Aranda, Saragossa (ES); Oscar Gracia Campos, Saragossa (ES); Paul Muresan, La Cartuja (ES); Daniel Palacios Tomas, Saragossa (ES); Diego Puyal Puente, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 734 days.

(21) Appl. No.: 17/791,551

(22) PCT Filed: Jan. 21, 2021

(86) PCT No.: PCT/EP2021/051278
§ 371 (c)(1),
(2) Date: Jul. 8, 2022

(87) PCT Pub. No.: WO2021/156065
PCT Pub. Date: Aug. 12, 2021

(65) Prior Publication Data
US 2023/0031284 A1     Feb. 2, 2023

(30) Foreign Application Priority Data
Feb. 7, 2020    (EP) .................................. 20382080

(51) Int. Cl.
*H05B 6/06*    (2006.01)
(52) U.S. Cl.
CPC ......... *H05B 6/065* (2013.01); *H05B 2213/03* (2013.01)

(58) Field of Classification Search
CPC ....... H05B 6/062; H05B 6/65; H05B 2213/03
See application file for complete search history.

(56) References Cited

U.S. PATENT DOCUMENTS

| | | | |
|---|---|---|---|
| 4,114,009 A * | 9/1978 | Kiuchi ................ | H05B 6/1245 219/625 |
| 2016/0150600 A1 * | 5/2016 | Lomp .................... | H05B 6/062 219/622 |
| 2016/0323937 A1 * | 11/2016 | Anton Falcon ........ | H05B 6/062 |
| 2018/0270914 A1 | 9/2018 | Calesella | |
| 2021/0385914 A1 * | 12/2021 | Gallivanoni .......... | H05B 6/065 |
| 2023/0292409 A1 * | 9/2023 | Kizilari ................ | H05B 6/1272 |

FOREIGN PATENT DOCUMENTS

| | | |
|---|---|---|
| EP | 2453714 A1 | 5/2012 |
| EP | 3496509 A1 | 6/2019 |
| WO | 2010069883 A1 | 6/2010 |

OTHER PUBLICATIONS

International Search Report PCT/EP2021/051278 dated Mar. 30, 2021.

* cited by examiner

*Primary Examiner* — Woody A Lee, Jr.
(74) *Attorney, Agent, or Firm* — Michael E. Tschupp; Brandon G. Braun; Andre Pallapies

(57) ABSTRACT

A cooking appliance apparatus includes a first inverter, a second inverter, a first inductor, a set of further inductors including a first further inductor and a second further inductor, and a switching arrangement configured such as to allocate in an operating state the first inverter to the inductor and to allocate the second inverter in the operating state to an arbitrary one of the first and second further inductors of the set of further inductors.

16 Claims, 10 Drawing Sheets

COOKING DEVICE

CROSS-REFERENCES TO RELATED APPLICATIONS

This application is the U.S. National Stage of International Application No. PCT/EP2021/051278, filed Jan. 21, 2021, which designated the United States and has been published as International Publication No. WO 2021/156065 A1 and which claims the priority of European Patent Application, Serial No. 20382080.8, filed Feb. 7, 2020, pursuant to 35 U.S.C. 119(a)-(d).

The contents of International Application No. PCT/EP2021/051278 and European Patent Application, Serial No. 20382080.8 are incorporated herein by reference in their entireties as if fully set forth herein.

BACKGROUND OF THE INVENTION

The invention relates to a cooking appliance apparatus, in particular a hob apparatus.

A hob that has two inverters and four inductors is already known from the prior art, wherein it is possible to allocate half of the inductors in each case to one of the inverters. Alternatively, it is possible to allocate half of the inductors to the two inverters, wherein however in this state the other half of the inductors is not allocated.

BRIEF SUMMARY OF THE INVENTION

The object of the invention resides in particular, however is not limited thereto, to providing an apparatus of the generic type having improved characteristics with regard to a flexibility. The object is achieved in accordance with the invention by the features of the independent claim, while advantageous embodiments and developments of the invention are apparent in the dependent claims.

The invention is based on a cooking appliance apparatus, in particular a hob apparatus, having at least one inverter, at least one further inverter, at least one inductor, at least one set of further inductors that has at least one first further inductor and at least one second further inductor, and at least one switching arrangement that in at least one operating state allocates the inverter to the inductor.

It is proposed that in the operating state, the further inverter can be allocated by means of the switching arrangement to at least one arbitrary further inductor of the set of further inductors, for example to the first and/or to the second further inductor.

It is possible owing to such an embodiment to achieve in particular improved characteristics with regard to a flexibility. In particular, it is consequently possible to provide a cooking appliance apparatus that has improved characteristics with regard to a flexible allocation of inductors and therefore in particular a flexible distribution of a heating power. In particular, it is possible for the heating power to be allocated in a more flexible manner, in particular with regard to a cookware configuration, to the respective item of cookware. In particular, it is possible, in particular owing to the increased flexibility of the cooking appliance apparatus, to operate a greater number of possible cookware configurations by means of the cooking appliance apparatus. In particular, it is possible by means of a single cooking appliance apparatus to operate an increased flexibility, in particular with regard to a combination of larger and smaller items of cookware. In particular, it is possible as a consequence to provide a higher degree of flexibility to a user of the cooking appliance apparatus. In particular, the user can distribute the cookware in a more flexible manner on the hob plate. In particular, it is possible to achieve a high degree of flexibility by means of a particularly cost-efficient number of components. In particular, the cooking appliance apparatus can be adapted in particular to the increasingly different sizes and qualities of cookware that are commercially available. In particular, it is possible to reduce and/or to eliminate limitations with regard to possible cookware configurations.

The cooking appliance apparatus could be for example an oven apparatus, advantageously a hob apparatus and particularly advantageously an induction hob apparatus. The term a "cooking appliance apparatus", in particular an "oven apparatus", advantageously a "hob apparatus" and particularly advantageously an "induction hob apparatus" is to be understood to mean in particular at least a part, in particular a sub-assembly, of a household appliance, in particular a cooking appliance, advantageously a hob and particularly advantageously an induction hob. A cooking appliance that has the cooking appliance apparatus could be for example an oven and/or a microwave and/or a grilling appliance and/or a steam cooking appliance. Advantageously, a household appliance that is designed as a cooking appliance is a hob and preferably an induction hob. The term a "hob apparatus", in particular an "induction hob apparatus", is to be understood to mean in particular at least a part, in particular a sub-assembly of a hob, in particular of an induction hob, wherein in particular in addition also accessory units for the hob can be included such as for example a sensor unit for the external measurement of a temperature of an item of cookware and/or food that is to be cooked. In particular, the hob apparatus, in particular the induction hob apparatus, can also comprise the entire hob, in particular the entire induction hob.

Advantageously, the cooking appliance apparatus has an inductor and a set of further inductors, wherein in particular the inductor and the further inductors of the set of further inductors can be designed in an at least essentially identical manner with respect to one another. In particular, the inductor and the further inductors of the set of further inductors have in particular identical components. Advantageously, the inductor and the further inductors only differ from one another by virtue of their schematic arrangement. The term "at least essentially" is to be understood to mean in this context in particular that a deviation deviates from a predetermined value, in particular less than 25%, preferably less than 10% and particularly preferably less than 5% of the predetermined value.

The term an "inductor" is to be understood to mean in this case in particular an element that has at least one induction coil and/or is designed as an induction coil and that is provided so as in at least one operating state to supply at least one receiving element with energy, in particular in the form of a magnetic alternating field. The receiving element is in particular designed as a part and/or a sub-assembly of a receiving unit and is in particular provided so as to receive the energy that is provided by at least one inductor. The receiving unit can be in particular a part of the cooking appliance apparatus. Alternatively, it is feasible that the receiving unit is designed as a unit that is independent of the cooking appliance apparatus and/or as part of a further apparatus that is independent of the cooking appliance apparatus. The receiving unit can be provided in particular for a placement on a region above the inductor and/or the further inductor. The receiving unit could be designed for example as an item of cookware and could have in particular at least one secondary coil as a receiving element so as to receive the energy that is provided by the inductor and/or the further inductor. Alternatively or in addition, the receiving element could also be designed as a metal heating means, in particular as an at least in part ferromagnetic heating means, for example as a ferromagnetic base of an item of cookware, in which in an operating state of the heating unit eddy currents and/or remagnetization effects are produced that are converted into heat.

The term a "set of further inductors" is to be understood to mean in particular a group of further inductors that has in particular at least one first further inductor and in particular at least one second further inductor. For example, the further inductors of the set of further inductors could differ from one another for example with regard to the provided power consumption and/or the provided power output and/or with regard to their geometry, and/or their size. Advantageously, the further inductors of the set of further inductors are designed at least essentially identical to one another. It is particularly advantageous that at least a majority of the further inductors of the set of further inductors is formed from at least essentially identical electrical components.

In particular, the cooking appliance apparatus has precisely one inverter and precisely one further inverter. Advantageously, the cooking appliance apparatus has two further inverters, particularly advantageously three further inverters and preferably at least four further inverters. The term an "inverter" is to be understood to mean in particular an electrical unit that in at least one operating state provides an in particular high frequency alternating current, in particular for the inductor and/or the set of further inductors. In particular, the inverter can have inverter switching elements that can be designed as IGBT, MOSFET, HEMT, JFET and/or as TRIAC. In particular, the inverter switching elements can be formed at least in part from a semiconductor material such as for example silicon, silicon carbide and/or gallium nitride and/or from another semiconductor material that appears expedient to the person skilled in the art.

For example, the inverter and the further inverter could differ from one another, for example with regard to the provided power consumption and/or the provided power output and/or with regard to their geometry, and/or their size and/or with regard to electronic components that form the respective inverter. Advantageously, the inverter and the further inverter are designed as at least essentially identical to one another. Particularly advantageously, at least a majority of the inverter and of the further inverter is formed from at least essentially identical electrical components.

The term a "switching arrangement" is to be understood to mean in particular an electrical unit that has in particular a plurality of switching elements. In particular, the switching arrangement is provided so as to allocate the inverter and/or further inverter to the inductors and/or further inductors of the set of further inductors. The term a "switching element" is to be understood to mean in particular an electronic element that is provided so as to produce and/or to disconnect an electrically conductive connection between two points, in particular contacts of the switching element. It is preferred that the switching element has at least one control contact and said switching element can be switched via said control contact. In particular, the switching element is designed as a semiconductor switching element, in particular as a transistor, advantageously as a bipolar transistor having preferably insulated gate electrode (IGBT). Alternatively, the switching element is formed as a mechanical and/or electromechanical switching element, in particular as a relay.

For example, the cooking appliance apparatus could have a control unit that controls the switching arrangement, in particular a configuration switching unit of the switching arrangement and/or a parallel switching unit of the switching arrangement, in dependence upon a cookware configuration. In particular, the control unit produces operating states, in particular by controlling the switching arrangement. The term a "control unit" is to be understood to mean in particular an electronic unit that is preferably at least in part integrated in a control and/or regulating unit of a cooking appliance and that is preferably provided so as to control and/or to regulate in particular at least the inverters and/or the further inverters and/or a switching arrangement. It is preferred that the control unit comprises a computing unit and in particular in addition to the computing unit a storage unit having a control and regulating program that is stored therein and said control and regulating program is provided so as to be executed by the computing unit. The term a "cookware configuration" is to be understood to mean in particular a number and/or a position and/or a quality of placed cookware, in particular cookware that is placed on the hob. In particular, a plurality of possible cookware configurations is feasible. For example the cookware configuration is a combination of number and/or position and/or quality of placed cookware. In particular, the control unit controls the switching arrangement, in particular a configuration switching unit of the switching arrangement and/or a parallel switching unit of the switching arrangement, in dependence upon the cookware configuration with the result that an allocation of the inductors and/or the further inductors of the set of further inductors to the inverter and/or the further inverter corresponds at least essentially to the cookware configuration. This means that the control unit is provided in particular so as to control the switching arrangement in dependence upon the cookware configuration in such a manner that placed cookware can be operated individually and at least essentially heated over the whole surface and with the heating power that is desired by the user and namely in particular in an operating state.

The term an "operating state" is to be understood to mean in particular a state of the cooking appliance apparatus in which in particular at least one inductor and/or a further inductor of the set of further inductors is operated, in particular so as to heat the cookware. In particular, a plurality of operating states is possible that differ from one another, in particular with regard to the allocation of inverters to inductors. In particular, in one operating state at least the inductor that is operated is allocated to an inverter, for example to the at least one inverter and/or to the at least one further inverter.

In particular, in the operating state in which in particular the inverter is allocated to the inductor, the further inverter can be allocated by means of the switching arrangement at least to an arbitrary further inductor of the set of further inductors, for example to the first and/or to the second further inductor. In particular, in the operating state in which in particular the inverter is allocated to the inductor, the switching arrangement is provided so as to allocate the further inverter to an arbitrary further inductor of the set of further inductors, for example to the first and/or to the second further inductor. In particular, in the operating state in which in particular the inverter operates the inductor, an arbitrary further inductor of the set of further inductors, for example the first and/or the second further inductor, can be operated in particular owing to the alternating current that is provided by the further inverter.

The fact that an inverter is allocated to an inductor is to be understood to mean in particular that the inverter is electrically connected by means of the switching arrangement to the inductor, in particular in order to achieve the operating state. In particular, this is to be understood to mean accordingly also an allocation in the opposite direction. The fact that an inverter can be allocated to an inductor is to be understood to mean in particular that the inverter can be electrically connected to the inductor by means of the switching arrangement, in particular in order to be able to achieve a further operating state.

The term "provided" is to be understood to mean in particular specifically programmed, designed and/or fitted. The fact that an object is provided for a specific function is to be understood to mean in particular that the object fulfils and/or performs this function in at least one application state and/or operating state.

Moreover, it is proposed that the set of further inductors has at least one third further inductor. As a consequence, in particular it is possible to provide a cooking appliance apparatus that in particular has a particularly high degree of flexibility, in particular with regard to possible configurations of cookware. For example, the set of further inductors has at least one fourth further inductor, preferably at least one fifth further inductor. It is particularly preferred that the set of further inductors has an arbitrary number of further inductors.

Moreover, it is proposed that in the operating state the further inverter can be allocated simultaneously by means of the switching arrangement to all the further inductors of the set of further inductors. In other words that in the operating state, the further inverter can simultaneously supply all the further inductors of the set of further inductors. In particular, the switching arrangement in the operating state in which the switching arrangement in particular allocates the inverter to the inductor, the switching arrangement can simultaneously allocate the further inverter to all the further inductors of the set of further inductors. Advantageously, it is possible consequently in the operating state, in particular owing to the allocation by means of the switching arrangement, to operate the inductor by the inverter and simultaneously to operate all the further inductors of the set of further inductors by the further inverter. As a consequence, it is possible in particular to achieve a high degree of flexibility, in particular with regard to possible cookware configurations. Since it is possible to provide a more flexible cooking appliance apparatus to the user, it is possible in particular to increase user satisfaction. Moreover, as a consequence it is possible in particular to omit multiplexing whereby in particular it is possible to increase efficiency.

Furthermore, it is proposed that by means of the switching arrangement two arbitrary adjacent inductors, for example the inductor and/or a further inductor of the set of further inductors, can be allocated in each case to different inverters. As a consequence, in particular in the case of the use of a small item of cookware that in each case is heated by precisely one inductor and/or precisely one further inductor, it is possible to achieve a high degree of flexibility, in particular with regard to the positioning of said item of cookware on the hob. In particular, it is possible for at least two items of cookware to be placed in an arbitrary position and in each case for said items of cookware to be operated by inductors that in each case are allocated to different inverters. For example, one of the inductors could be allocated to the inverter and a further inductor of the set of further inductors could be allocated to the further inverter. In particular, as a consequence two adjacent items of cookware, in other words two items of cookware that are placed adjacent on the hob plate in an arbitrary position, can be operated with an in each case individual heating power. For example, it is possible by means of the switching arrangement for two arbitrary adjacent inductors to be allocated in each case simultaneously to different inverters.

Moreover, it is proposed that the switching arrangement has at least one configuration switching unit and it is possible by means of said configuration switching unit to individually electrically disconnect each of the inductors from the inverters. As a consequence, it is possible in particular to achieve a high degree of flexibility since in particular each inductor can be individually disconnected from the inverters. Moreover, as a consequence it is possible to achieve a high degree of efficiency since each of the inductors that is not to be operated can be electrically disconnected from the inverters and consequently is not supplied with alternating current. The term a "configuration switching unit" is to be understood to mean in particular an electrical unit that is provided so as in at least one operating state to individually electrically disconnect each of the inductors from the inverters and in at least one further operating state to individually electrically connect each of the inductors to the inverters. In particular, the configuration unit is provided so as to electrically disconnect each inductor, which is not to be operated in the operating state, from the inverters. In particular, the configuration unit is provided so as to electrically connect each inductor, which is to be operated in the operating state, to the inverters. In particular, the configuration unit can electrically disconnect each of the inductors from the inverters and/or can electrically connect each of the inductors to the inverters in an arbitrary combination. For example, the configuration unit can simultaneously electrically disconnect each of the inductors from the inverters and/or can connect each of the inductors to the inverters.

Moreover, it is proposed that the configuration switching unit has at least one configuration switching element that is arranged schematically between at least one of the inductors and at least one further switching element, in particular a parallel switching element of the switching arrangement. As a consequence, it is possible to provide in particular a cooking appliance apparatus having a particularly high degree of efficiency. The configuration switching element can be designed in particular as a switching element. In particular, the configuration switching element is connected directly to the at least one further switching element that can be in particular a parallel switching element or can be connected to a resonance capacitance. In particular, it is feasible that the further switching element, which can be in particular a parallel switching element, is not installed. In particular, the configuration switching unit then has at least one configuration switching element that is arranged schematically between at least one of the inductors and a resonance capacitance of the cooking appliance apparatus. The term a "resonance unit" is to be understood to mean in particular a unit that comprises at least one resonance capacitance that is preferably formed by at least one capacitor that is preferably different from an attenuation capacitance and/or a capacitance that is connected in parallel with respect to a switching element. In particular, a resonance capacitance is formed by a combination of series and parallel circuits of multiple capacitors. The resonance capacitance is in particular part of an electrical resonant circuit, in particular an electrical series resonant circuit. It is preferred that the resonance capacitance is connected in at least one operating state, in particular via the configuration switching element, in series to the inductor and is particularly advantageously provided so as to be charged via the inductor by at least one of the inverters. The resonance capacitance is arranged in particular on a side of the inductor that is remote from the inverter when viewed in the direction of a conducting path. For example, at least one and preferably each of the inductors and/or at least one of the further inductors of the set of further inductors is operated in a full bridge circuit. In a full bridge circuit, the inductor is arranged in the bridge branch together with a resonance capacitance, which is preferably connected in series to the inductor, between two voltage dividers that are formed by inverters. It is preferred that at least one and preferably each of the inductors and/or at least one of the further inductors of the set of further inductors is operated in a half bridge circuit. In a half bridge circuit, the inductor is arranged in the bridge branch between a voltage divider, which is formed by at least one inverter, and a voltage divider that is formed by two resonance capacitances. Advantageously, the configuration switching unit has at least two configuration switching elements, particularly advantageously at least three configuration switching elements, preferably at least four configuration switching elements and particularly preferably at least five configuration switching elements. For example, the number of configuration switching elements could correspond to a number of inductors.

Furthermore, it is proposed that the switching arrangement has at least one parallel switching unit and it is possible by means of said parallel switching unit to connect the inverter and the further inverter in parallel. In particular, the term a "parallel switching unit" is to be understood to mean an electrical unit that is provided so as in at least one operating state to connect at least the inverter and the further inverter in parallel. In particular, in at least the operating state in which the inverter and the further inverter are connected in parallel by means of the parallel switching unit of the switching arrangement, the inverters can supply at least the inductor and/or a further inductor of the set of further inductors simultaneously with alternating current. As a consequence, it is possible in particular to achieve a particularly high heating power. Since as a consequence, in particular it is possible to provide a particularly high heating power to the user, it is possible as a consequence moreover in particular to increase user satisfaction. Moreover, it is possible as a consequence in particular to achieve a higher degree of flexibility, in particular with regard to possible allocations of inverters to inductors.

Moreover, it is proposed that the parallel switching unit has at least one parallel switching element that is arranged schematically between at least one of the inverters and at least one further switching element of the switching arrangement, in particular the configuration switching element. As a consequence, it is possible to provide a particularly component efficient parallel circuit of the inverter and the further inverter. In particular, it is possible as a consequence to achieve a particularly high degree of flexibility and namely in particular with regard to possible cookware configurations. In particular, it is possible as a consequence to supply an item of cookware with energy from multiple inverters. As a consequence, it is consequently possible to provide in particular user satisfaction. The at least one parallel switching element could be designed for example as a switching element. Alternatively or in addition thereto, it is feasible that the parallel switching unit has at least one parallel switching element that is arranged schematically between at least the inductors and/or a further inductor of the set of further inductors and at least one further switching element of the switching arrangement, in particular the configuration switching element. Advantageously, the parallel switching unit has at least two parallel switching elements, particularly advantageously at least three parallel switching elements, preferably at least four parallel switching elements and particularly preferably at least five parallel switching elements. For example, the number of parallel switching elements could correspond to a number of inverters.

Moreover, it is proposed that an arbitrary number of inductors can be allocated to each of the inverters by means of the switching arrangement. As a consequence, it is possible to achieve in particular a high degree of flexibility, in particular with regard to a possible number of inductors that are operated in particular using an identical heating power in particular from the same inverter. In particular, it is possible as a consequence to select in a maximally flexible manner a number of inductors, which are operated by a common inverter. In particular, it is possible by means of the switching arrangement of each of the inverters to supply an arbitrary number of inductors with alternating current. In particular, it is possible by means of the switching arrangement to allocate the inductors and/or the further inductors of the set of further inductors in an arbitrary number and/or combination to each of the inverters. Alternatively or in addition thereto, by means of the switching arrangement an arbitrary number of inverters can be allocated in each case to each of the inductors.

Furthermore, it is proposed that by means of the switching arrangement at least one and preferably at least a majority of the inductors can be simultaneously or alternately allocated to each of the inverters. The fact that at least one and preferably at least a majority of the inductors can be "simultaneously or alternately" allocated to each of the inverters is to be understood to mean in particular that the inductor and/or at least a further inductor of the set of further inductors in an operating state can be electrically connected simultaneously to each of the inverters of the cooking appliance apparatus and in a further operating state can be individually electrically connected to in each case an inverter and/or an arbitrary combination of inverters. The expression "at least a majority of the inductors" is to be understood to mean in this context in particular a number of at least 50% of all the inductors of the cooking appliance apparatus. In particular, as a consequence it is possible to achieve a particularly high degree of flexibility, in particular with regard to heating power that is required individually at a respective inductor.

The cooking appliance apparatus in this case is not to be limited to the above described application and embodiment. In particular, it is possible for the cooking appliance apparatus to have a number that differs from the number of individual elements, components and units that is mentioned herein so as to fulfil a function that is described herein.

Further advantages are provided in the following description of the figures. Multiple exemplary embodiments of the invention are illustrated in the figures. In order to differentiate the exemplary embodiments, the reference characters of the following description of the figures are supplemented with the letters a to e. In relation to components that are referred to identically, in particular in relation to components with identical reference characters, reference is made in principle to the description and/or the drawings of the first exemplary embodiment having the letter a. The descriptions and further exemplary embodiments are essentially limited to the differences between the exemplary embodiments. The figures, the description of the figures and the claims include numerous features in combination. The person skilled in the art will expediently take the features into consideration individually and will combine said features into expedient further combinations.

DETAILED DESCRIPTION OF EXEMPLARY EMBODIMENTS OF THE PRESENT INVENTION

Figure 1:
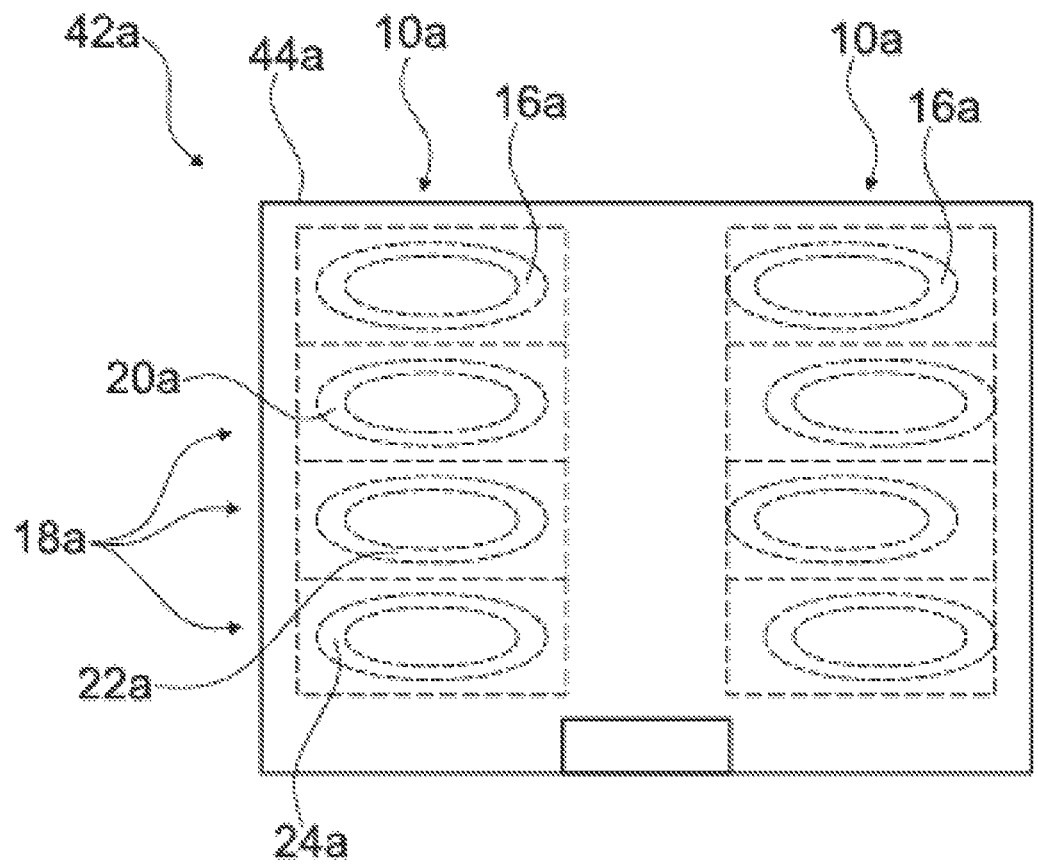
FIG. 1 shows a hob having a cooking appliance apparatus, which is designed as a hob apparatus, in an in part transparent plan view.

Of the objects that are provided multiple times in the figures, in each case only one of them is provided with a reference character.

FIG. 1 illustrates a household appliance 42a, in particular a cooking appliance, which is designed as a hob 44a, in particular as an induction hob. In the illustrated example, the hob 44a has two cooking appliance apparatuses 10a that are designed as hob apparatuses. In the illustrated example, the hob apparatuses are designed as induction hob apparatuses. In particular, parts of the cooking appliance apparatus 10a are further illustrated with the aid of a schematic illustration in FIG. 2.

The cooking appliance apparatus 10a has an inverter 12a. Moreover, the cooking appliance apparatus 10a has a further inverter 14a. The cooking appliance apparatus 10a has an inductor 16a. The cooking appliance apparatus 10a has a set of further inductors 18a. The set of further inductors 18a in the illustrated example has a first further inductor 20a, a second further inductor 22a and a third further inductor 24a.

A first connection of the inductor 16a is connected to a first resonance capacitance 70a of the cooking appliance apparatus 10a. A first connection of the first further inductor 20a is connected to the first resonance capacitance 70a. A first connection of the second further inductor 22a is connected to a second resonance capacitance 72a. A first connection of the third further inductor 24a is connected to the second resonance capacitance 72a.

The cooking appliance apparatus 10a has a switching arrangement 26a. In the operating state that is illustrated by way of example, the switching arrangement 26a allocates the inverter 12a to the inductor 16a.

In the operating state that is illustrated by way of example, it is possible to allocate the further inverter 14a by means of the switching arrangement 26a to an arbitrary further inductor 20a, 22a, 24a of the set of further inductors 18a. It is possible by means of the allocation by the switching arrangement 26a for the further inverter 14a to operate an arbitrary further inductor 20a, 22a, 24a of the set of further inductors 18a. In the operating state that is illustrated by way of example, it is possible by means of the switching arrangement 26a for the further inverter 14a to be allocated simultaneously to all the further inductors 20a, 22a, 24a of the set of further inductors 18a.

It is possible by means of the switching arrangement 26a to allocate two arbitrary adjacent inductors 16a, 20a, 22a, 24a in each case to different inverters 12a, 14a. Moreover, it is possible by means of the switching arrangement 26a to allocate one of the inductors 16a, 20a, 22a, 24a simultaneously or alternately to each of the inverters 12a, 14a. Moreover, it is possible by means of the switching arrangement 26a to allocate an arbitrary number of inductors 16a, 20a, 22a, 24a to each of the inverters 12a, 14a.

In the illustrated example, the switching arrangement 26a has a configuration switching unit 28a and it is possible by means of said configuration switching unit to individually electrically disconnect each of the inductors (16a, 20a, 22a, 24a) from the inverters (12a, 14a).

The configuration switching unit 28a has a configuration switching element 30a. Moreover, in the illustrated example the configuration switching unit 28a has a second configuration switching element 46a, a third configuration switching element 48a and a fourth configuration switching element 50a.

In the illustrated example, the switching arrangement 26a has a parallel switching unit 36a and it is possible by means of said parallel switching unit to connect the inverter 12a and the further inverter 14a in parallel. The parallel switching unit 36a has a parallel switching element 38a. Moreover, the parallel switching unit 36a has a second parallel switching element 56a.

A first connection of the configuration switching element 30a is electrically connected to the inductor 16a. A second connection of the configuration switching element 30a is connected to the second configuration switching element 46a, to the second parallel switching element 56a and to the inverter 12a. A first connection of the second configuration switching element 46a is electrically connected to the first further inductor 20a and to the parallel switching element 38a. A second connection of the second configuration switching element 46a is connected to the configuration switching element 30a and to the inverter 12a.

A first connection of the third configuration switching element 48a is electrically connected to the second further inductor 22a and to the second parallel switching element 56a. A second connection of the third configuration switching element 48a is connected to the fourth configuration switching element 50a and to the further inverter 14a. A first connection of the fourth configuration switching element 50a is electrically connected to the third further inductor 24a. A second connection of the fourth configuration switching element 50a is connected to the third configuration switching element 48a, to the parallel switching element 38a and to the further inverter 14a.

Figure 3:
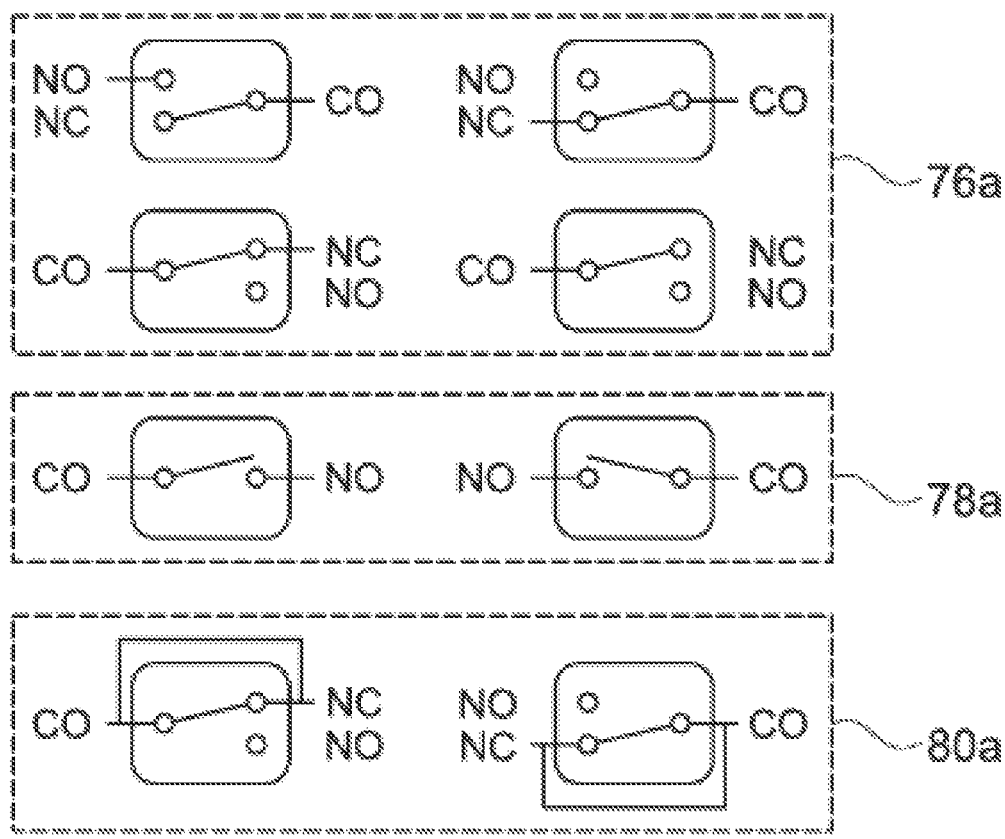
FIG. 3 shows an overview of possible switching elements of the switching arrangement.

FIG. 3 illustrates an overview of possible switching elements, in particular relays, that can form in particular the configuration switching elements 28a and/or the parallel switching elements 36a of the switching arrangement 26a. For the sake of clarity, the possible switching elements can be grouped into a first group 76a, into a second group 78a and into a third group 80a of switching elements. In particular, the first group 76a comprises toggle switches that can be designed in each case as a normally closed embodiment or normally open embodiment and can be installed in an arbitrary direction. In particular, the second group 78a comprises on/off switches. The third group 80a comprises in particular toggle switches having a bridging connection.

Figure 2:
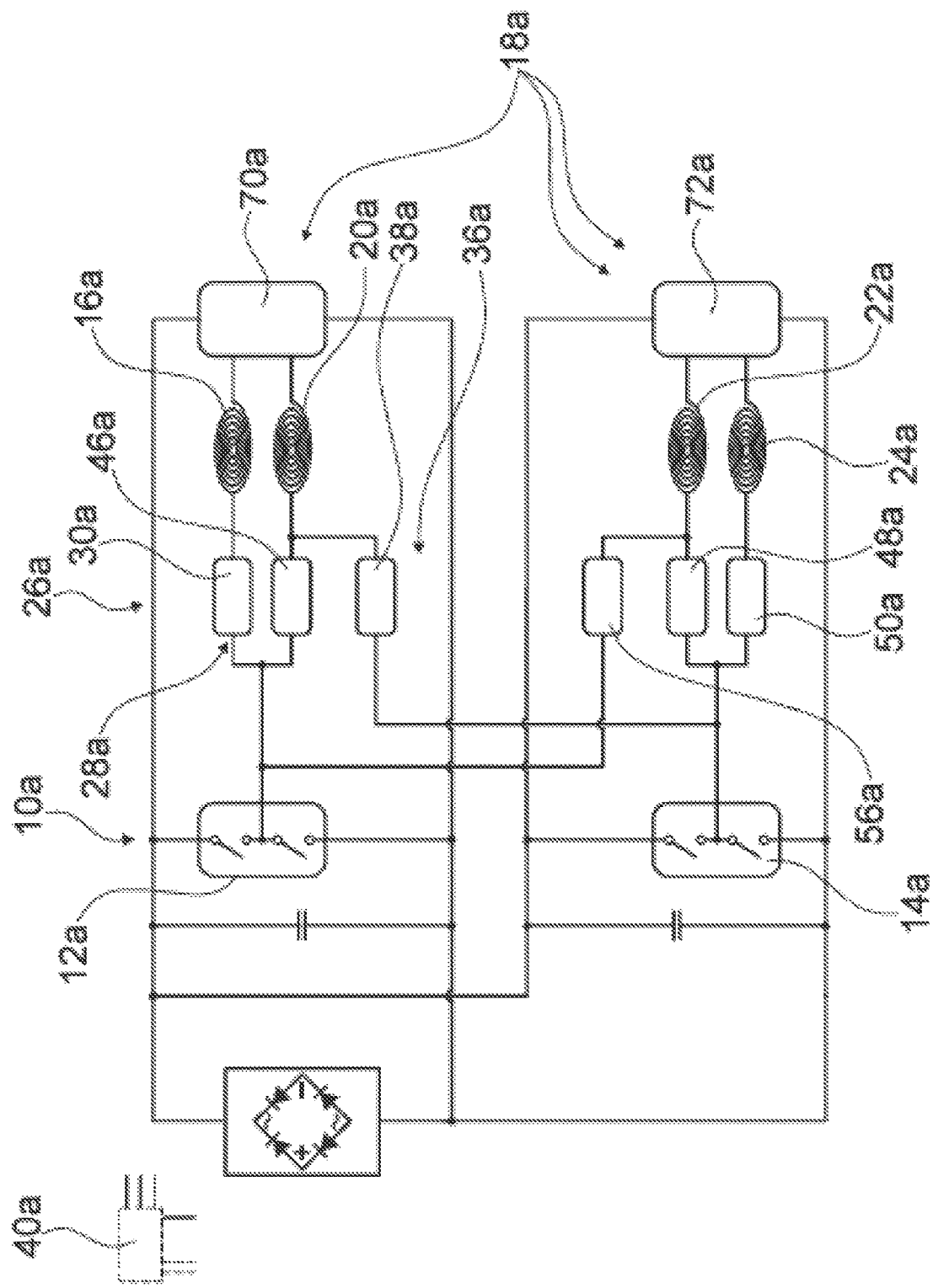
FIG. 2 shows in a schematic illustration the cooking appliance apparatus having an inverter, having a further inverter, having an inductor, having a set of further inductors and having a switching arrangement.

The switching elements, which are illustrated in this exemplary embodiment, in particular in FIG. 2, of the configuration switching unit and the parallel switching unit can be designed in each case as a switching element of the first group 76a and/or as a switching element of the second group 78a.

Figure 4:
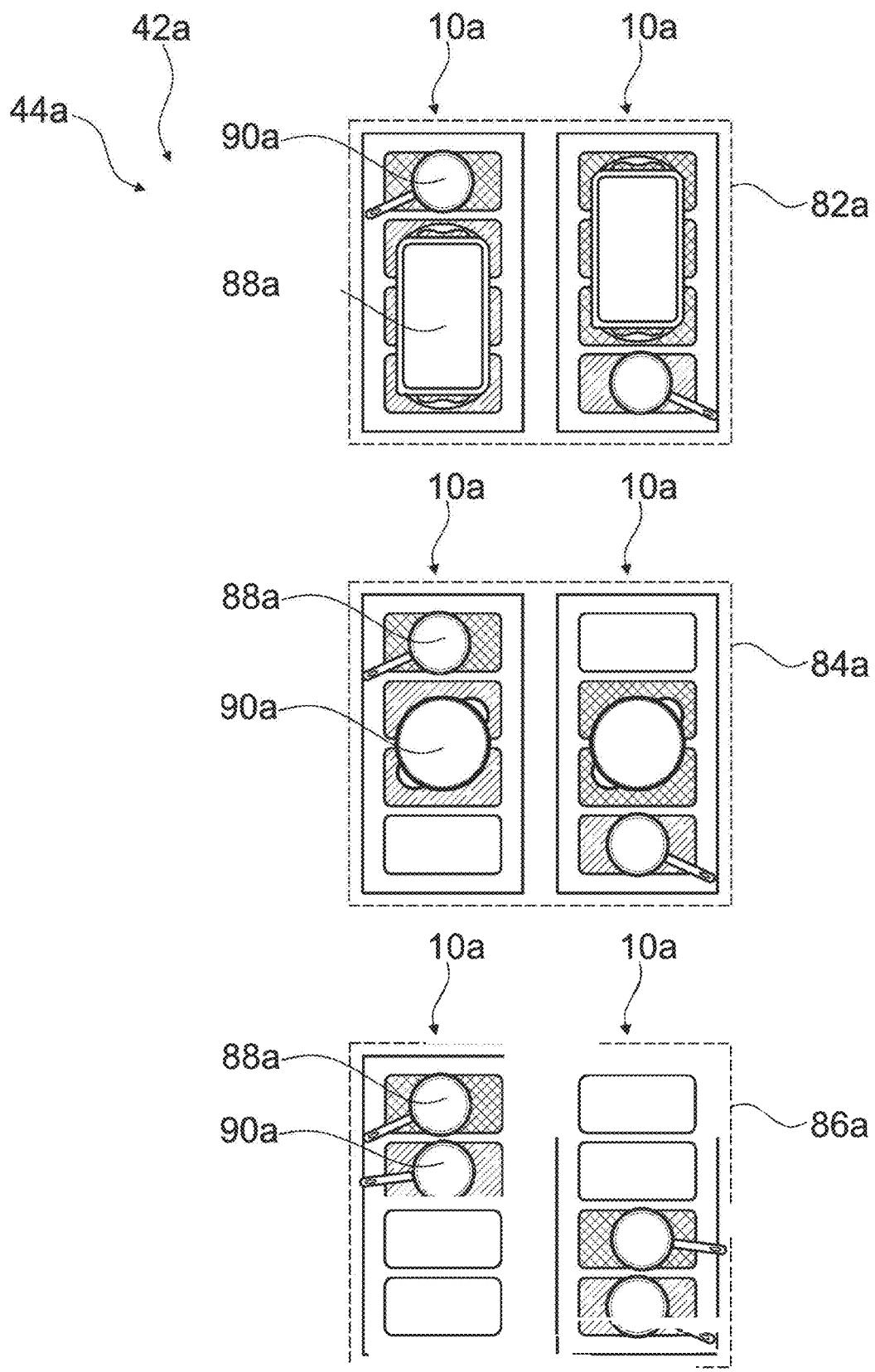
FIG. 4 shows an overview of possible operating states of the cooking appliance apparatus.

The cooking appliance apparatus has a control unit 40a that is illustrated schematically in FIG. 2. The control unit 40a is provided so as to control the switching arrangement 26a in dependence upon a cookware configuration 82a, 84a, 86a. FIG. 4 illustrates an exemplary selection of possible cookware configurations 82a, 84a, 86a in each case in the operating state. In the respective exemplary cookware configurations 82a, 84a, 86a in each case a first item of cookware 88a and a second item of cookware 90a is placed on the hob 44a. In dependence upon the cookware configuration 82a, 84a, 86a, the control unit 40a controls the switching arrangement 26a with regard to the respective required allocation of inductors and inverters.

The first cookware configuration 82a illustrates a first item of cookware 88a that is heated in the illustrated operating state by three further inductors of the set of further inductors (not further illustrated) that are all allocated to the further inverter (schematized by the hatching). Moreover, the first cookware configuration 82a illustrates a second item of cookware 90a that is heated in the illustrated operating state by the inductor (not further illustrated) that is allocated to the inverter (schematized by the hatching).

The second cookware configuration 84a illustrates a first item of cookware 88a that is heated in the illustrated operating state by the inductor (not further illustrated) that is allocated to the inverter (schematized by the hatching). Moreover, the second cookware configuration 82a illustrates a second item of cookware 90a that is heated in the illustrated operating state by two further inductors of the set of further inductors (not further illustrated) that are all allocated to the further inverter (schematized by the hatching).

Four further exemplary embodiments of the invention are illustrated in FIGS. 5 to 12. The subsequent descriptions are limited essentially to the differences between the exemplary embodiments, wherein in relation to components, features and functions that remain the same it is possible to refer to the description of the other exemplary embodiments, in particular FIGS. 1 to 4. In order to differentiate the exemplary embodiments, the letter a in the reference characters of the exemplary embodiment of the FIGS. 1 to 4 is replaced by the letters b, c, d and e in the reference characters of the exemplary embodiments of FIGS. 5 to 12. In relation to components that remain the same, in particular in relation to components having identical reference numerals, it is possible in principle to also refer to the drawings and/or the description of the other exemplary embodiments, in particular FIGS. 1 to 4.

Figure 5:
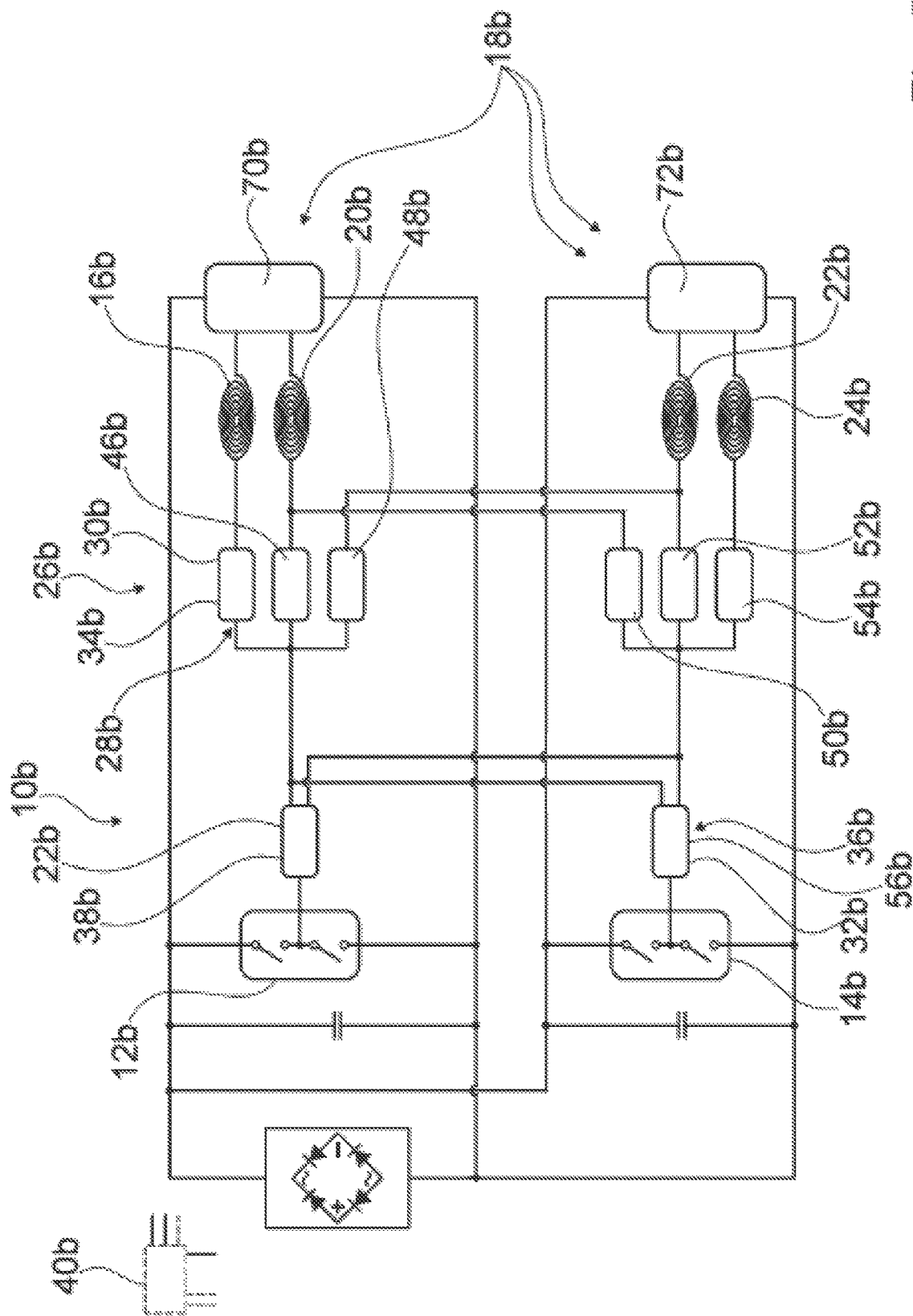
FIG. 5 shows in a schematic illustration a further exemplary embodiment of a cooking appliance apparatus having a switching arrangement.

FIG. 5 illustrates a further exemplary embodiment of a cooking appliance apparatus 10b. The cooking appliance apparatus 10b has a configuration switching unit 28b and a parallel switching unit 36b.

The configuration switching unit 28b has a configuration switching element 30b, a second configuration switching element 46b, a third configuration switching element 48b, a fourth configuration switching element 50b, a fifth configuration switching element 52b and a sixth configuration switching element 54b.

The configuration switching element 30b, the second configuration switching element 46b, the third configuration switching element 48b, the fourth configuration switching element 50b, the fifth configuration switching element 52b and the sixth configuration switching element 54b are arranged in each case schematically between an inductor 16b, 20b, 22b, 24b of the cooking appliance apparatus 10b and a further switching element 32b of the switching arrangement 26b.

The parallel switching unit 36b has a parallel switching element 38b and a second parallel switching element 56b. The parallel switching element 38b and the second parallel switching element 56b are arranged schematically between one of the inverters 12b, 14b of the cooking appliance apparatus 10b and at least one further switching element 34b of the switching arrangement 26b.

Figure 6:
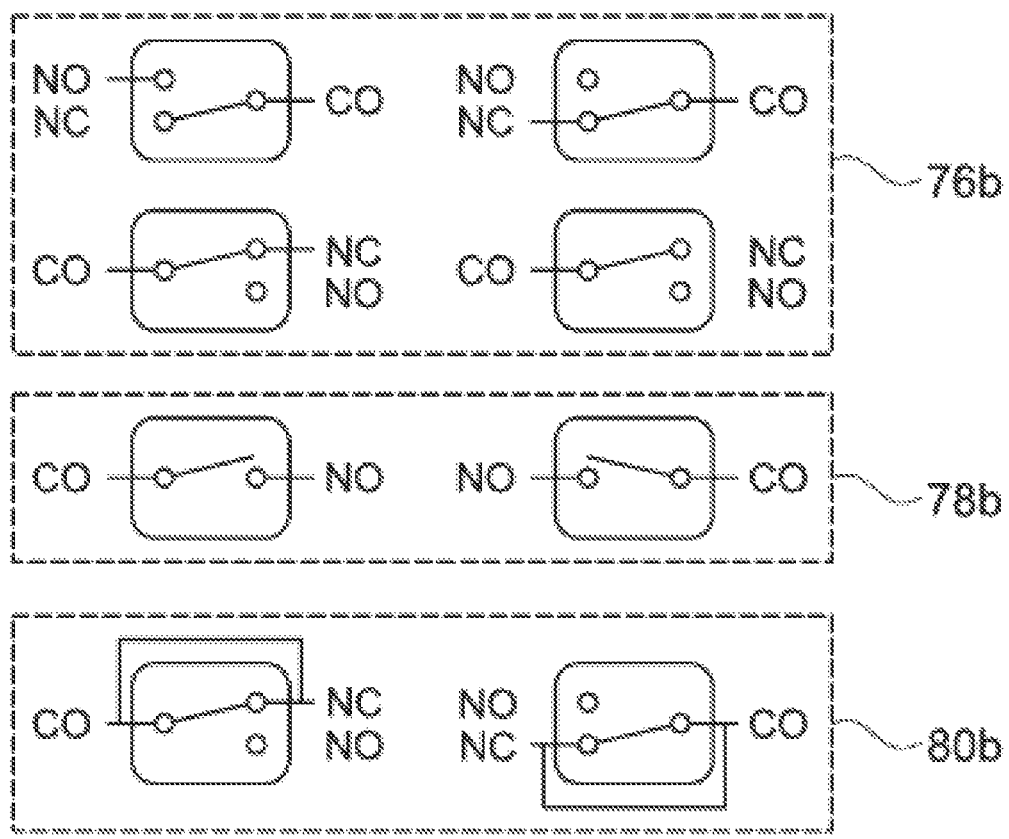
FIG. 6 shows an overview of possible switching elements of the switching arrangement in FIG. 5.

FIG. 6 illustrates an overview of possible switching elements, in particular relays, that can form in particular the configuration switching elements of the configuration switching unit 28b and/or the parallel switching elements of the parallel switching unit 36b of the switching arrangement 26b. For the sake of clarity, the possible switching elements can be grouped into a first group 76b, into a second group 78b and into a third group 80b of switching elements. In particular, the first group 76b comprises toggle switches that can be designed in each case as a normally closed embodiment or a normally open embodiment and can be installed in an arbitrary direction. In particular, the second group 78b comprises on/off switches. The third group 80b comprises in particular toggle switches having a bridging connection.

The parallel switching elements of the parallel switching unit 36b are in each case designed as one of the possible switching elements of the first group 76b and/or as one of the possible switching elements of the third group 80b. The configuration switching elements of the configuration switching unit 28b are in each case designed as one of the possible switching elements of the first group 76b and/or as one of the possible switching elements of the second group 78b.

Figure 7:
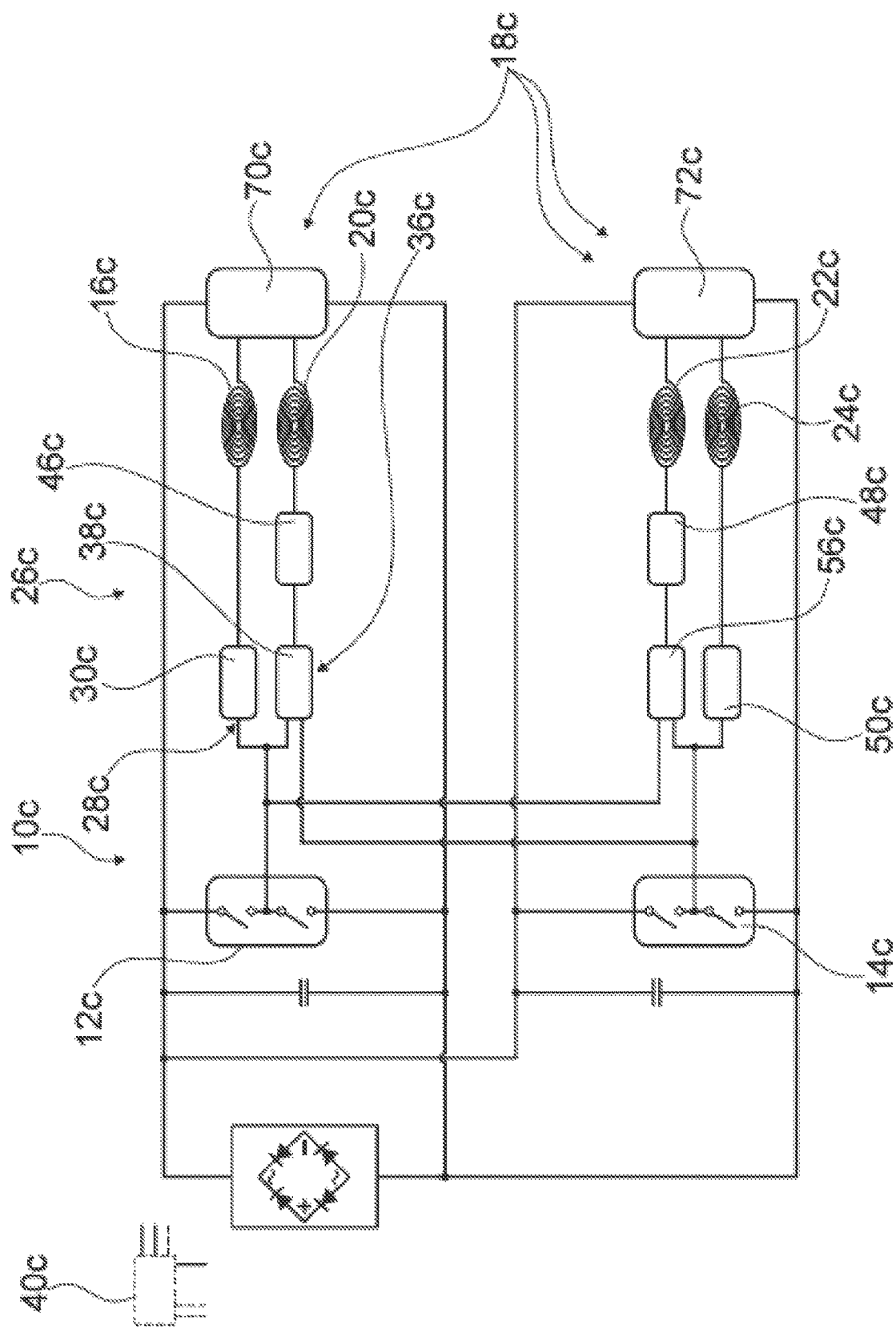
FIG. 7 shows in a schematic illustration a further exemplary embodiment of a cooking appliance apparatus having a switching arrangement.

FIG. 7 illustrates a further exemplary embodiment of a cooking appliance apparatus 10c. The cooking appliance apparatus 10c has a configuration switching unit 28c and a parallel switching unit 36c. The configuration switching unit 28c has a configuration switching element 30c, a second configuration switching element 46c, a third configuration switching element 48c and a fourth configuration switching element 50c. The parallel switching unit 36c has a parallel switching element 38c and a second parallel switching element 56c.

The configuration switching element 30c is arranged schematically between an inverter 12c of the cooking appliance apparatus 10c. The fourth configuration switching element 50c is arranged schematically between a further inverter 14c of the cooking appliance apparatus 10c. The second configuration switching element 46c is arranged schematically between the parallel switching element 38c and a first further inductor 20c of the cooking appliance apparatus 10c. The third configuration switching element 48c is arranged schematically between the second parallel switching element 56c and a second further inductor 22c of the cooking appliance apparatus 10c.

Figure 8:
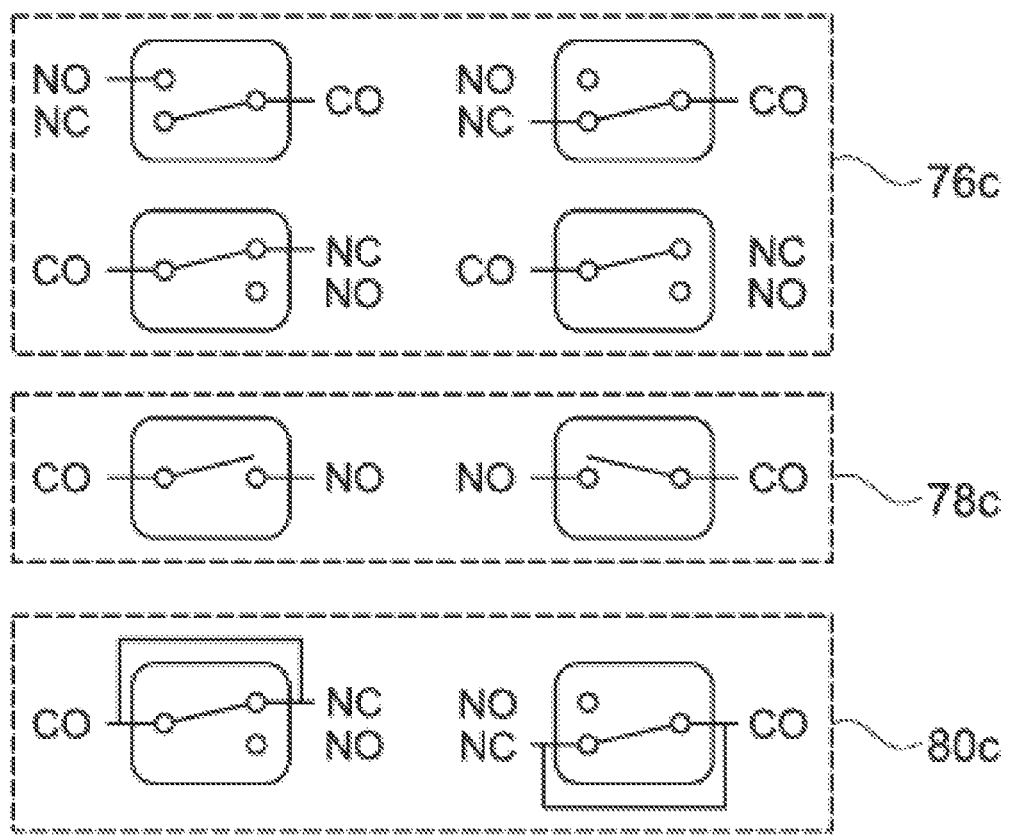
FIG. 8 shows an overview of possible switching elements of the switching arrangement in FIG. 7.

FIG. 8 illustrates an overview of possible switching elements, in particular relays, that can form in particular the configuration switching elements of the configuration switching unit 28c and/or the parallel switching elements of the parallel switching unit 36c of the switching arrangement 26c. For the sake of clarity, the possible switching elements can be grouped into a first group 76c, into a second group 78c and into a third group 80c of switching elements. In particular, the first group 76c comprises toggle switches that can be designed in each case as a normally closed embodiment or a normally open embodiment and can be installed in an arbitrary direction. In particular, the second group 78c comprises an on/off switch. The third group 80c comprises in particular toggle switches having a bridging connection.

The parallel switching elements 38c of the parallel switching unit 36c are in each case designed as one of the possible switching elements of the first group 76c. The configuration switching elements 30c of the configuration switching unit 28c are in each case designed as one of the possible switching elements of the first group 76c and/or as one of the possible switching elements of the second group 78c.

Figure 9:
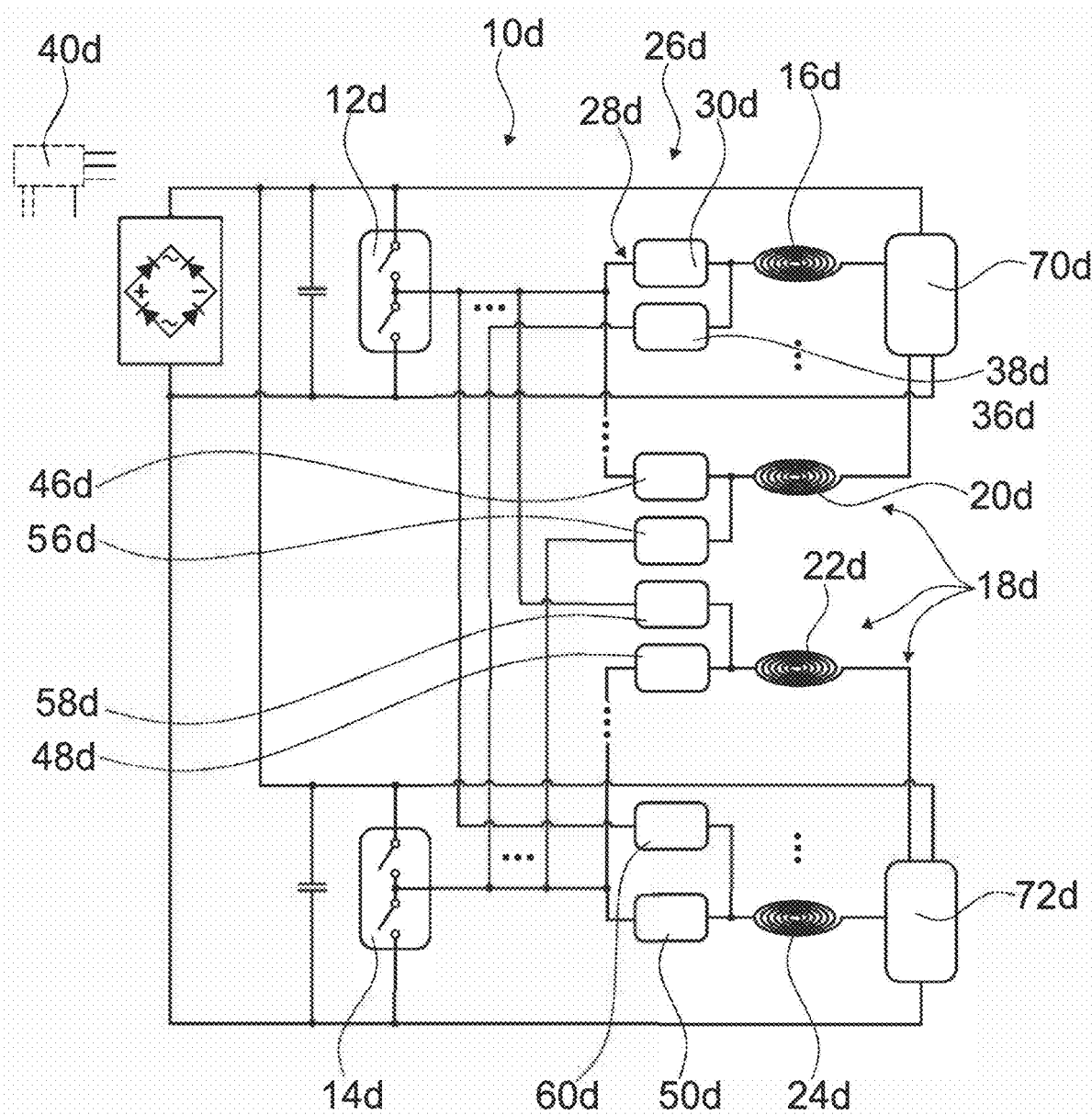
FIG. 9 shows in a schematic illustration a further exemplary embodiment of a cooking appliance apparatus having a switching arrangement and FIG. 10 shows in a schematic illustration a further exemplary embodiment of a cooking appliance apparatus having a switching arrangement.

FIG. 9 illustrates a further exemplary embodiment of a cooking appliance apparatus 10d having a switching arrangement 26d in a schematic illustration. The switching arrangement 26d in addition has a third parallel switching element 58d and a fourth parallel switching element 60d. The cooking appliance apparatus 10d is in particular a generalization of the previous exemplary embodiments, in particular with regard to the switching arrangement 26d, that in particular renders possible an arbitrary number of further inductors of a set of further inductors 18d of the cooking appliance apparatus 10d (illustrated by the points).

Figure 10:
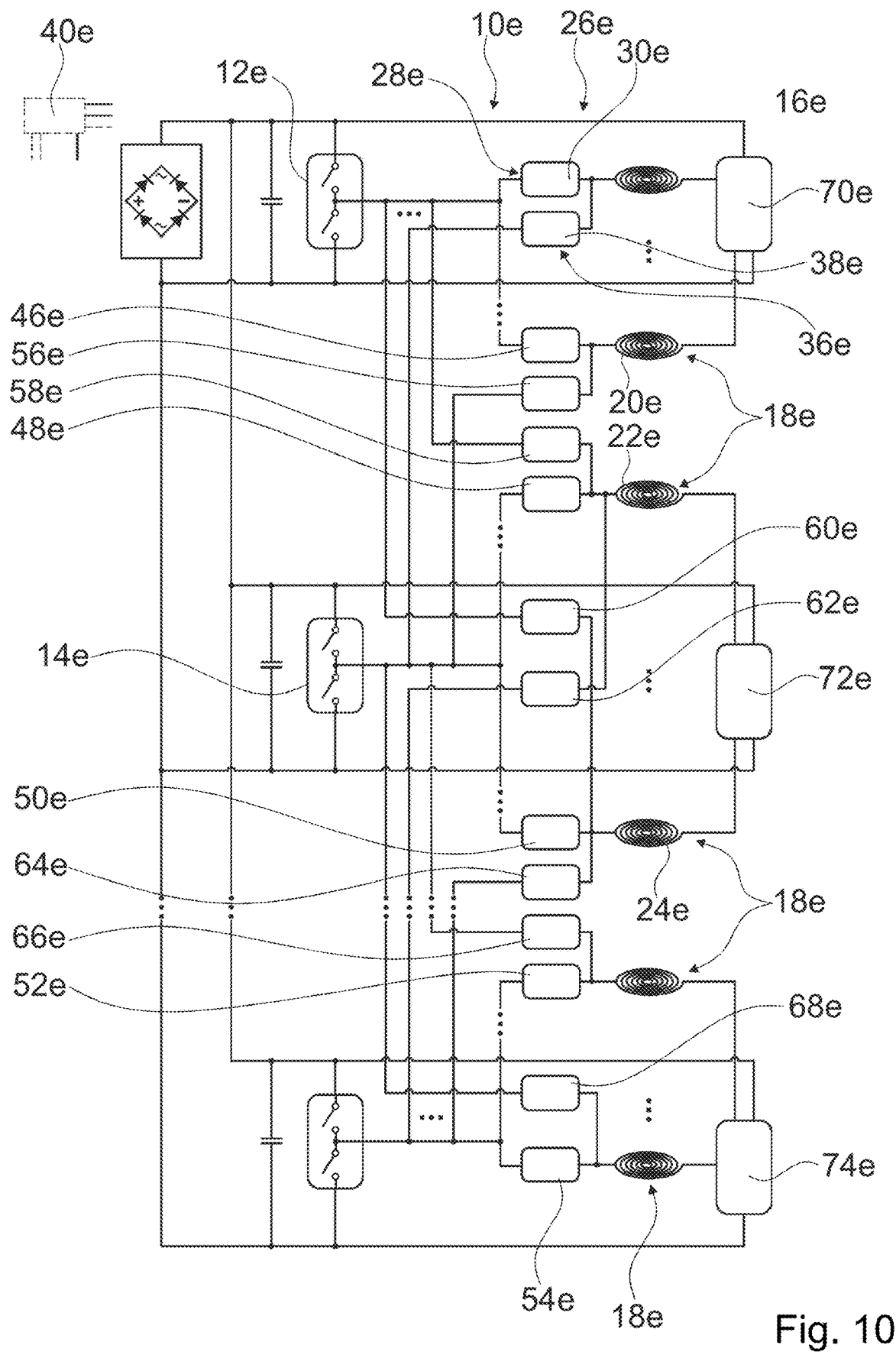

FIG. 10 illustrates a further exemplary embodiment of a cooking appliance apparatus 10e having a switching arrangement 26e in a schematic illustration. The switching arrangement 26e in addition has a fifth parallel switching element 62e, a sixth parallel switching element 64e, a seventh parallel switching element 66e and an eighth parallel switching element 68e. Moreover, the cooking appliance apparatus 10e has a third resonance capacitance 74e. Moreover, the cooking appliance apparatus 10e has two further inverters 14e.

The cooking appliance apparatus 10e is in particular a generalization of the previous exemplary embodiment, in particular with regard to the switching arrangement 26e, that in particular renders possible an arbitrary number of further inductors of a set of further inductors 18e of the cooking appliance apparatus 10e and/or further inverters (illustrated by the points).

The invention claimed is:

1. A cooking appliance apparatus, comprising:
    a first inverter;
    a second inverter;
    a first inductor;
    a set of further inductors including a first further inductor and a second further inductor; and
    a switching arrangement configured such as to allocate in an operating state the first inverter to the inductor and to allocate the second inverter in the operating state to an arbitrary one of the first and second further inductors of the set of further inductors,
    wherein the set of further inductors includes a third further inductor,
    the switching arrangement includes a configuration switching unit which is configured to individually electrically disconnect each one of the first inductor and the first, second and third further inductors from the first and second inverters, and
    the configuration switching unit includes a configuration switching element and a further switching element, said configuration switching element being arranged schematically between the further switching element and at least one of the first inductor and the first, second and third further inductors.

2. The cooking appliance apparatus of claim 1, constructed in the form of a hob apparatus.

3. The cooking appliance apparatus of claim 1, wherein the switching arrangement is configured to allocate the second inverter in the operating state simultaneously to the first, second and third further inductors of the set of further inductors.

4. The cooking appliance apparatus of claim 1, wherein the switching arrangement is configured to allocate any two adjacent ones of the first inductor and the first, second and third further inductors to different ones of the first and second inverters.

5. The cooking appliance apparatus of claim 1, wherein the switching arrangement includes a parallel switching unit which is configured to connect the first inverter and the second inverter in parallel.

6. The cooking appliance apparatus of claim 5, wherein the parallel switching unit includes a parallel switching element arranged schematically between at least one of the first and second inverters and a further switching element of the switching arrangement.

7. The cooking appliance apparatus of claim 1, wherein the switching arrangement is configured to allocate an arbitrary number of the first inductor and the first, second and third further inductors to each of the first and second inverters.

8. The cooking appliance apparatus of claim 1, wherein the switching arrangement is configured to allocate at least one of the first inductor and the first, second and third further inductors simultaneously or alternately to each of the first and second inverters.

9. A household appliance, comprising a cooking appliance apparatus, said cooking appliance apparatus comprising a first inverter, a second inverter, a first inductor, a set of further inductors including a first further inductor and a second further inductor, and a switching arrangement configured such as to allocate in an operating state the first inverter to the inductor and to allocate the second inverter in the operating state to an arbitrary one of the first and second further inductors of the set of further inductors,
    wherein the set of further inductors includes a third further inductor,
    the switching arrangement includes a configuration switching unit which is configured to individually electrically disconnect each one of the first inductor and the first, second and third further inductors from the first and second inverters, and
    the configuration switching unit includes a configuration switching element and a further switching element, said configuration switching element being arranged schematically between the further switching element and at least one of the first inductor and the first, second and third further inductors.

10. The household appliance of claim 9, constructed in the form of a hob.

11. The household appliance of claim 9, wherein the switching arrangement is configured to allocate the second inverter in the operating state simultaneously to the first, second and third further inductors of the set of further inductors.

12. The household appliance of claim 9, wherein the switching arrangement is configured to allocate any two adjacent ones of the first inductor and the first, second and third further inductors to different ones of the first and second inverters.

13. The household appliance of claim 9, wherein the switching arrangement includes a parallel switching unit which is configured to connect the first inverter and the second inverter in parallel.

14. The household appliance of claim 13, wherein the parallel switching unit includes a parallel switching element arranged schematically between at least one of the first and second inverters and a further switching element of the switching arrangement.

15. The household appliance of claim 9, wherein the switching arrangement is configured to allocate an arbitrary number of the first inductor and the first, second and third further inductors to each of the first and second inverters.

16. The household appliance of claim 9, wherein the switching arrangement is configured to allocate at least one of the first inductor and the first, second and third further inductors simultaneously or alternately to each of the first and second inverters.

* * * * *